United States Patent
Klepsvik

(10) Patent No.: US 8,665,122 B2
(45) Date of Patent: Mar. 4, 2014

(54) SYSTEM FOR THE DETECTION AND THE DEPICTION OF OBJECTS IN THE PATH OF MARINE VESSELS

(75) Inventor: John O. Klepsvik, Flataasen (NO)

(73) Assignee: Kongsberg Seatex AS, Trondheim (NO)

( * ) Notice: Subject to any disclaimer, the term of this patent is extended or adjusted under 35 U.S.C. 154(b) by 292 days.

(21) Appl. No.: 13/055,003

(22) PCT Filed: Aug. 12, 2009

(86) PCT No.: PCT/NO2009/000286
§ 371 (c)(1),
(2), (4) Date: Feb. 1, 2011

(87) PCT Pub. No.: WO2010/024683
PCT Pub. Date: Mar. 4, 2010

(65) Prior Publication Data
US 2011/0128162 A1 Jun. 2, 2011

(30) Foreign Application Priority Data
Aug. 12, 2008 (NO) .................................. 20083495

(51) Int. Cl.
*G08G 3/00* (2006.01)
(52) U.S. Cl.
USPC ............ 340/985; 701/400; 701/508; 701/21; 318/588
(58) Field of Classification Search
USPC ........................................................ 340/985
See application file for complete search history.

(56) References Cited

U.S. PATENT DOCUMENTS

| | | | |
|---|---|---|---|
| 6,344,937 B1 * | 2/2002 | Sparrold et al. | 359/837 |
| 2004/0233414 A1 * | 11/2004 | Jamieson et al. | 356/4.01 |
| 2006/0028533 A1 * | 2/2006 | Nakajima | 347/233 |
| 2007/0035624 A1 | 2/2007 | Lubard et al. | |
| 2007/0165967 A1 | 7/2007 | Ando et al. | |
| 2008/0169969 A1 * | 7/2008 | Shirai | 342/107 |

FOREIGN PATENT DOCUMENTS

JP   2004 150898   5/2004

* cited by examiner

*Primary Examiner* — George Bugg
*Assistant Examiner* — Anthony D Afrifa-Kyei
(74) *Attorney, Agent, or Firm* — Ladas & Parry LLP

(57) ABSTRACT

System for detection and depiction of objects in the path of marine vessels and for warning about objects that may constitute a risk to the navigational safety. The system includes a sweeping unit for illumination of objects within the field of view of the system, including a light source which emits a beam within the field of view of the system, an optical sensor and pulse processing unit including optical detectors for monitoring of the beam output power and generation of a start pulse for measurement of distance, for detection/reception of radiant energy reflected from objects, including measurement of distance to the reflecting object(s) based on the time delay between emitted and reflected light, including energy and peak effect of the pulses. The sweeping unit sweeps the beam and the optical detector's instantaneous field of view over the sweep area, by means of first and second sweeping mechanisms, to obtain directional information related to the instantaneous radiation direction relative to the vessel.

14 Claims, 6 Drawing Sheets

SYSTEM FOR THE DETECTION AND THE DEPICTION OF OBJECTS IN THE PATH OF MARINE VESSELS

BACKGROUND OF THE INVENTION

The invention concerns a system for detection and depiction of objects in the path of speedboats and other marine vessels, including warning about objects that may constitute a danger to navigation safety.

Increasing vehicle and vessel speed in passenger transportation, car transportation and goods traffic has increased the consequences from collision with floating objects. During recent years, the number of containers flushed overboard has increased significantly, and represents a high risk of accidents at sea in combination with drift timber and small leisure boats including certain whale species.

U.S. Pat. No. 5,465,142 describes a sweeping laser-radar-system for detection of obstacles to helicopters and other aircrafts. The laser-radar-technology per se is described relatively detailed in "IR/EO Systems Handbook", SPIE, 1992.

Fast moving vessels are, in addition to radar, equipped with photosensitive video camera located as high as possible to improve overview of the water in front of the vessel. However, systems of this type are highly dependent on the light conditions and are not particularly useful when sailing at night in overcast weather.

During recent years, passive IR depiction based upon the FLIR ("Forward Looking Infra Red") technology has been used for night vision and detection of drifting objects. This technique is based upon detection of small temperature differences between the object and the environments, and objects which have been in the sea for a long time may exhibit very small temperature difference and are therefore difficult to detect.

However, neither photosensitive camera nor IR systems are able to determine exact distances to objects within the view port.

SUMMARY OF THE INVENTION

The main objective of the invention is to create a system for use on speed boats and other vessels to detect and issue a warning about drifting objects and other obstacles to navigation in the vessels course which solves the prior art problems described above. Moreover, it is an objective that the system is operable under all light conditions, both day and night, and provides a three dimensional depiction of objects upon and above the sea level within a certain sector, including accurate distance measurements to the objects. Moreover, it is an objective that the system provides an improved depiction at difficult visibility in fog and precipitation compared to light sensitive cameras and passive IR systems.

Finally, it is an objective that the system is arranged to stabilize the sweep area both in the horizontal and the vertical plane from the vessel's rolling and stamping movements, including short-lived deviations from controlled course (gearing), so that the vessel movements will not affect the quality of the system.

The invention concerns a system for use on speed boats and other vessels which is intended to detect and issue a warning about drifting objects and other obstacles to navigation within the vessel course.

The system is operable under all light conditions, both day and night, and provides a three-dimensional depiction of objects upon and above the sea level within a certain sector, including measurements of the accurate distances to the objects. Moreover, the system can provide an improved depiction under difficult visibility in fog and precipitation compared to light sensitive cameras and passive IR systems.

Selection of laser wave length makes the system absolutely eye safe with regard to the prevailing Norwegian and international eye safety standard[1], even when viewed through a binocular for marine use.

The system operates similar to traditional marine radars in that a laser beam pulse sweeps the field of view and detects the energy reflected passively from the surface. By using short pulses within the infrared wave length interval, we can obtain a resolution within the cm area both laterally and longitudinally (distance resolution). Contrary to traditional marine radar, the laser beam is swept both vertically and horizontally, resulting in a three-dimensional depiction, which makes it possible to detect wave height and height of objects relative to the sea level (for example bridge span etc.).

Contrary to laser-radar systems for positioning and target tracking, which are based on use of cooperating elements (retro-reflectors), the current invention is based on passive reflection of incoming light beams similar to a traditional camera.

The system in accordance with the invention can fulfil all requirements stated in the IMO standard for "Night Vision" IMO Res. MSC 94(72)[2] and is capable of being approved in accordance with the ISO test standard ISO 16273; 2003(E)[3].

The system comprises principally a sweeping unit (sweeping head) which is located upon the wheel house roof or in the mast with a free view to the field of view in question, and an operator unit/screen unit located in the wheel house within the primary field of view of the navigator.

The sweeping unit preferably comprises two sweeping mechanisms, one that sweeps the laser beam in a vertical sector and illuminates a line on the sea level radial from the sweeping unit (line sweeper), and another that sweeps the line horizontally over the field of view in question (azimuth sweeper). The sweeping arrangement is constructed in a manner that it can stabilize the sweep against rolling and stamping movements including small course deviations to provide a stable picture of the environments. Moreover, the sweeping unit preferably comprises an optical sensor unit which detects the reflected laser pulses including fast analogous circuits based on the time difference between sent and reflected pulse, including pulse energy and pulse peak effect.

The operator/screen unit preferably comprises signal and control processors for processing the optimal sensor signals, including angle information form the encoders on engine shafts which drives the sweeping arrangement. Also the information from the rolling and stamping sensors is treated here to provide steering information to stabilize the sweep.

Then, the detected optical signals are processed together with the angle information from the sweeping mechanisms and external navigation data (position, speed, rolling, stamping and throw) so that the position and intensity of every single laser pulse reflected can be presented in geographical coordinates (Latitude, Longitude, Height) and as picture information on a screen. This picture information can be shown both in central projections such as for a camera, or in vertical projection (PPI) such as for radar. Moreover, the picture information is analyzed in an ARPA module to establish the nearest distance ("Closest Point of Approach, CPA") and time to the nearest distance (TCPA) for objects in the vicinity of the vessel course. Should CPA reside within a defined safety zone for the vessel, an ARPA message in accordance with the NMEA/IEC standard[4] is sent to other navigation monitors (ECDIS, Radar), optionally also to the vessel alarm system.

Further details and advantageous features of the invention will appear from the following example description.

BRIEF DESCRIPTION OF THE DRAWINGS

The invention will now be detailed with reference to the attached drawings, wherein.

DESCRIPTION OF THE PREFERRED EMBODIMENTS

Figure 1:
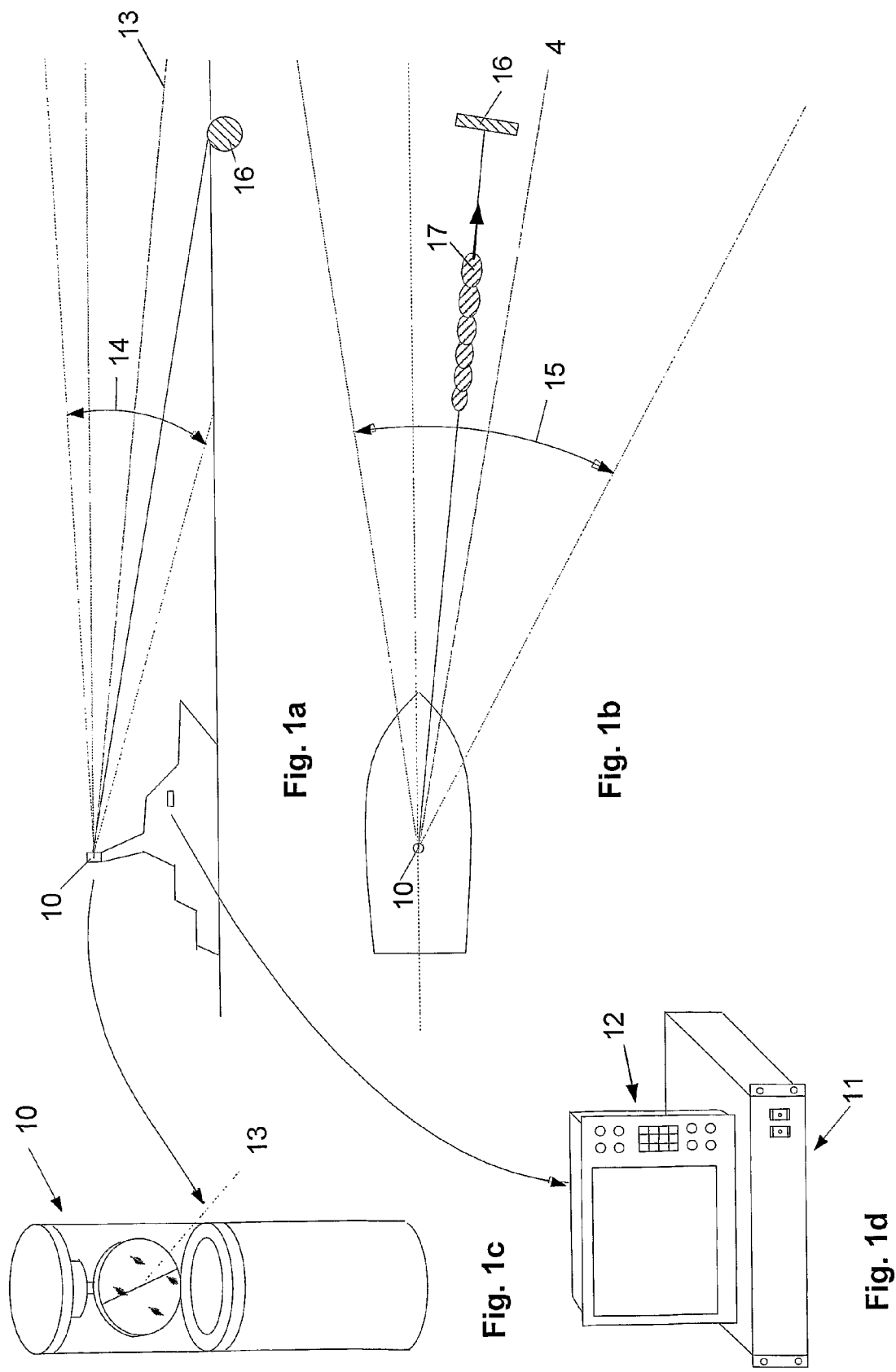
FIG. 1a and FIG. 1b show a vessel provided with a system in accordance with the invention.
FIG. 1c shows a sweeping unit.
FIG. 1d shows an operator panel/screen.

Firstly referring to FIGS. 1a and 1B, which illustrate a vessel provided with a system in accordance with the invention, hereinafter referred to as a marine laser-radar-system, abbreviated MLR system. The MLR system comprises a sweeping unit 10 (sweeping head) (shown enlarged in FIG. 1c), a control unit 11 and an operator panel (screen) 12 (shown in FIG. 1d). The sweeping unit 10 is arranged on a mast or to another platform above the wheel house roof to a vessel having best possible sight to the observation area. The control unit 11 is mounted within the wheel house to the vessel and integrated with existing power supply, navigation equipment, monitors and internal communication to show both video and radar pictures, and to notify about detected obstructions in a planned vessel course.

The MLR system can search a sector around a centre axis 13 by sweeping an infrared laser beam vertically within a vertical sector 14 and horizontally within a horizontal sector 15 or by a continuous rotation in the horizontal plane (as for a traditional radar). The centre axis 13 can be selected arbitrarily within 360 degrees horizontally from the operator panel. The distance to an object 16 within the sweeping sector is measured by using pulsed laser beam and by measuring the time between transmission and reception of the reflected laser pulse, like traditional radar. That is the reason for the term Laser-Radar (LR).

A laser illuminates a small area 17 (footprint, FIG. 1b, FIG. 2) with an extension defined by the opening angels of the laser and the distance to the object 16. At the same time, this area is depicted on an optical detector which can be a simple detector element or a matrix (array) of detector elements. By using a detector matrix, a space like resolution within the illuminated area is achieved, given by the number of elements in the detector matrix. An example of distribution of footprint and resolution elements in a plane perpendicular to the centre axis 13 is shown in FIG. 2 for a square detector matrix having 4×4 (16) elements. This regular pattern is produced by sweeping the laser beam about two axis by means of two independent sweep mechanisms 19, 20 (sweepers), illustrated in FIG. 3. The first sweeping mechanism 19 distributes the laser spots along a line 18, whereas the other sweeping mechanism 20 displaces these lines parallel so that they fill the whole view field in azimuth. The laser rate of fire and line displacement is done so that the field of view is covered by partly overlapping laser spots. A continuous sampling of the sweep sector is performed by turning the direction of the horizontal sweep each time the sector limits has been reached or by a continuous horizontal rotation.

Figure 3:
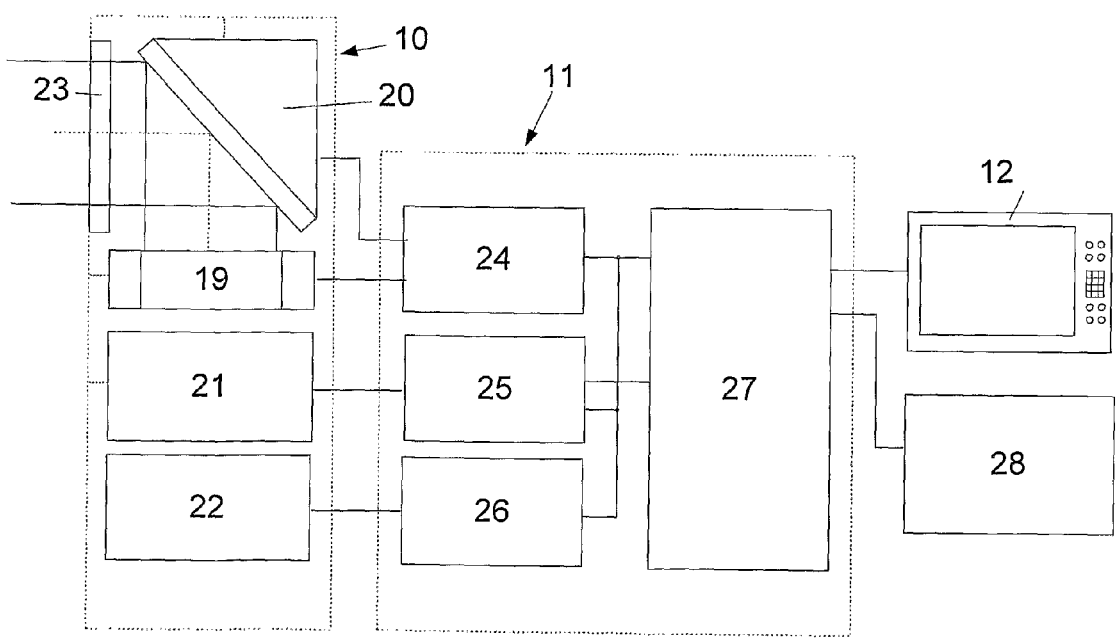
FIG. 3 shows a block diagram of a vessel installation.

With reference to FIG. 3, the figure shows a block diagram of a vessel installation. In addition to the two sweeping mechanisms, the sweeping unit 10 comprises an optical/sensor and pulse processing unit 21, a laser controlling unit 22 and an optical window 23, whereas the controller 11 comprises a sweep engine controller 24, signal processor 25, time controller and controller electronics 26, and a picture and control processor 27. The picture and control processor 27 is provided with outputs for connecting to the operator control unit 12 and the vessel navigation and communication system 28.

Figure 4:
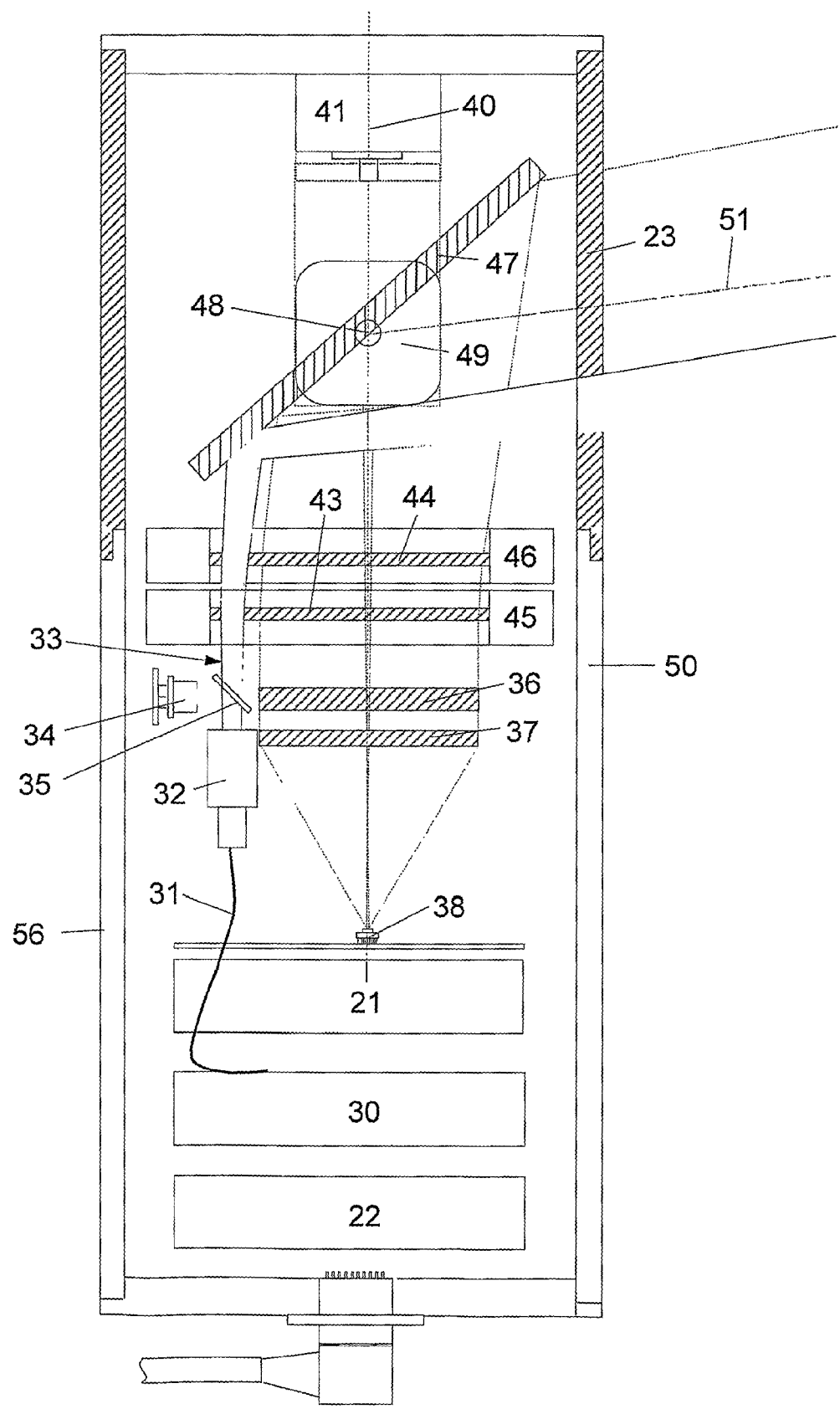
FIG. 4 shows a cross section of a sweeping unit in accordance with the invention.

With reference to FIG. 4, the figure shows a cross section of the sweeping unit 10. The illumination source in the system is preferably an eye safe IR laser 30 having a fibre-optical 31 feeding of the laser light to an optical collimator 32 which transforms the laser light to a beam 33 having a footprint adapted to the distribution of the elements in the detector matrix. A small part of this beam 33 is directed to an optical detector 34 via a beam divider 35 for monitoring of the output power and generation of a start pulse for the distance measurement. Moreover, the optical/sensor unit 21 comprises an optical filter 36 for elimination of background light, a collector lens (objective) 37 for reception of the filtered light reflected back from objects 16 within the field of view, and an optical detector 38 in focus of a receptor objective. The receptor objective 37 can be a non-spherical Fresnel lens or other lens combinations, possibly telescope, having a low F-number and with a resolution ability better than the dimensions of the detector elements in the optical detector 34.

The first sweeping mechanism 19 (line sweeper) comprises two optical deflection elements 43, 44 which are driven by two engines 45, 46 having internal rotors. The deflection elements 43, 44 can be wedge prisms (Risley prisms), optical transmission grids ("Volume Bragg Grating, VBG") or diffractive optical elements (DOE), all having the characteristic that they deflect an incoming optical beam by a fixed angle. At high rotational speeds on the sweep engines 45, 46, it is preferred to use a diffractive optical element (DOE) or an optical transmission grid (VBG) as beam deflector to obtain a balanced rotator. By means of such arrangement, both the laser beam and the field of view for the objective 37 are swept along a substantially straight line with an orientation defined by the mutual angles between the deflection elements 43, 44 (discussed in further detail below in connection with FIG. 5).

After deflection in the first deflection mechanism 19, the laser beam and the receptor field of view are deflected by the second sweeping mechanism 20 which is a mirror surface 47, about 45 degrees relative to the main axis 40 of the sweeping unit 10 and which is rotated about the main axis 40 by means of an engine 41 (azimuth sweeper). To generate a vertical line sweep for all azimuth angles, the orientation of the line sweep must be turned synchronically with the azimuth sweep, so that the sweep line is situated in the inlet plan normally to the mirror plane. This is performed by controlling the phase of the second sweep engine 46 in relation to the first engine 45 (explained in further detail below in connection with FIG. 5d).

The sweep pattern can also be stabilized with regard to rolling movements of the vessel by the phase controlling of the two sweep engines 45, 46 mentioned above. In addition, the mirror 47 can be tilted about an axis 48 perpendicular to the main axis 40 by means of an engine 49 to stabilize the sweep pattern in relation to the horizontal plane from stamping movements of the vessel.

Preferably, all components in the sweep unit 10 are mounted in a water proof cylindrical house 50 with a cylindrical window 34 for transmission of laser light and reflected light from illuminated objects 16 within the field of view.

Figure 5A:
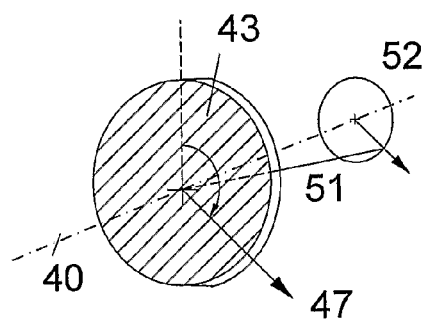
FIGS. 5a-d show the principle of a sweeping mechanism in accordance with the invention.
Figure 5C:
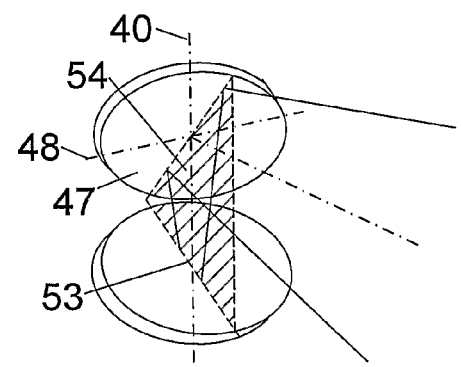
Figure 5B:
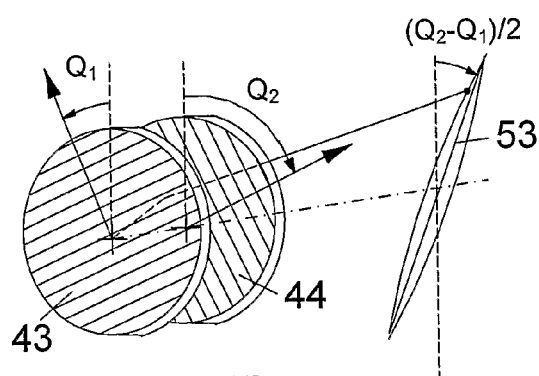

With reference to FIGS. 5a-b, the drawings show the principle of the first sweeping mechanism 19, which is a so-called line sweeper. A perpendicularly incoming laser beam is deflected in a direction 51 perpendicular to the stripe pattern (main direction) in a DOE/VBG 43, and when this rotates about the main axis the beam will describe a circle 52 in a plan perpendicular to the main axis 40 (FIG. 5a). By placing a new DOE/VBG 44 after the first (FIG. 5b), the beam will be deflected again in a direction determined by the main direction of the same. Should the main directions be coinciding for the two DOE/VBG 43, 44, too small angles (<5 degrees) will make the total deflection to become twice the deflection of the individual DOE/VBG 43, 44. When we rotate the two DOE/VBG 43, 44 with the same speed in separate direction, the beam will describe an approximately straight line 53 having a direction determined by the difference between the main directions of the two DOE/VBG 43, 44. At constant rotational speed the total deflection will be determined by a sinus function of time and having amplitude equal to the double of the deflection for the DOE/VBG 43, 44.

The deviation from a straight line (FIG. 5b) is caused by the distance between the DOE/VBG's 43, 44 and equals the diameter of the circle 52 which the beam from the first DOE/VBG 43 describes on the other DOE/VBG 44 (by a magnitude of 1 mm). However, the direction will be the same, independent of this displacement, resulting in a negligible deviation at longer distances.

Figure 2:
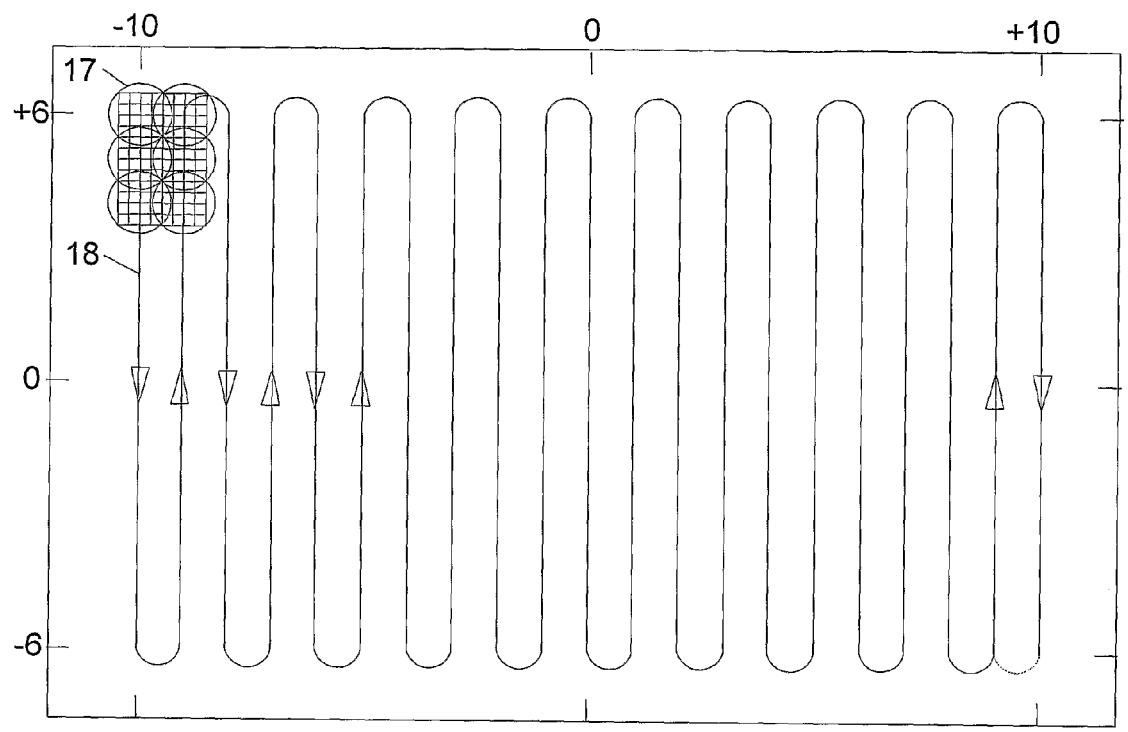
FIG. 2 shows an example of distribution of footprint and resolution elements in a plane perpendicular to the centre axis.

In order to generate a regularly and stable sweep pattern as shown in FIG. 1, some presumptions have to be fulfilled. In order to obtain a mutual parallel displacement of the vertical lines 18 (FIG. 2) by rotation of the second sweep mechanism 20, i.e. the mirror 47, the sweep lines 53 must be located in the inlet plane 54 perpendicular to the mirror surface 47, which means that the sweep lines 53 must be rotated synchronous with the rotation of the sweep mirror 47, see FIG. 5c. This is obtained by incrementing the phase of the motor 46 for the second DOE/VBG 44 in relation to the motor 45 for the first DOE/VBG 43 for every half rotation, so that the turning of the sweep line equals the turning angle of the sweep mirror 47.

Figure 5D:
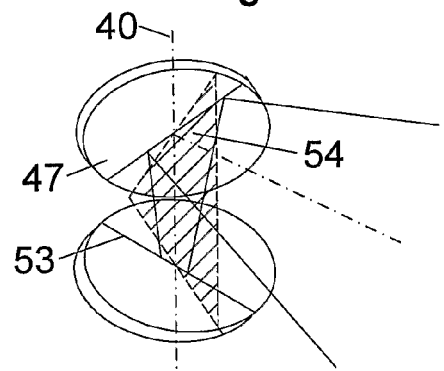

The described sweep arrangement also enables stabilization of the sweep pattern for rolling and stamping movements, including small course deviations (gearing) of the vessel in a relatively simple manner. As illustrated in FIG. 5d, a rotation of the sweep line 53 a small angle out of the inlet plane 54 for the mirror surface 47 results in a similar rotation of the vertical sweep lines 17. In the same manner a tilting of the mirror 47 about the second axis 48 will move the sweep pattern up or down in relation to the horizontal plane. If the laser beam is oriented along the vessel longitudinal axis (rolling axis), a rolling movement will be compensated by turning the sweep line 53 an angle equal to the rolling angle but with opposite sign. In the same manner, in order to compensate for stamping movements, the mirror 47 must be rotated an angle equal to the stamping angle, but with opposite sign. Small deviations from planned course (gearing) are corrected by turning the mirror 47 about the main axis 40. For other orientations (azimuth) of the laser beam, the compensation angles will be determined by known transformations of the rolling, stamping and gearing angles.

The two DOE/VBG 43, 44 in the first sweeping mechanism 19 are preferably mounted in the rotor part of the conventional brush-free DC engines which rotate on a turbine type bearing. Conventional angle encoders record position and speed of the DOE/VBG 43, 44. The sweep engine controller 24 preferably consists of conventional electronic servomotor units which adjust speed and phase of the DOE/VBG 43, 44 based upon input signals from positioning sensors (angle encoders) and selected values for sweeping direction and sweeping speed from the operator control unit 11.

The second sweeping mechanism 20 is preferably controlled by a conventional step motor/driving unit with an integrated angle encoder. The motor stepping is synchronized with the first sweeping mechanism 19, so that the beginning of the step starts immediately before the sweep line 53 has reached the extreme point and is terminated when the sweep line 53 starts to move in the opposite direction.

The motor 49 for stabilization of the sweep mirror 47 in the second sweeping mechanism 44 is preferably also a conventional servomotor/driving unit with an integrated angle encoder controlled by the rolling and stamping angle information provided by the vessel navigation system (attitude sensors), including the horizontal (azimuth) direction of the laser beam 33.

Figure 6:
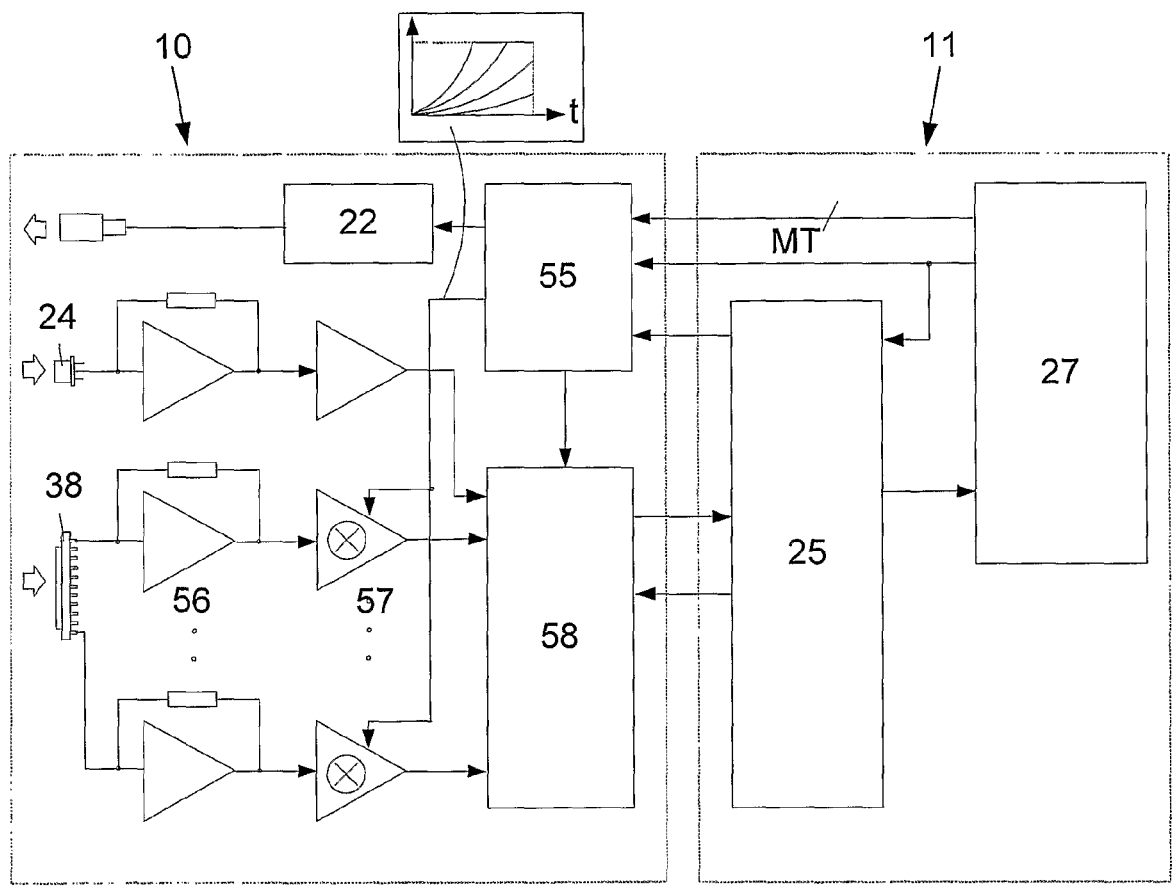
FIG. 6 shows schematically the analogue signal processing for the system.

The time controller and controller electronics unit 26 provides starting pulses to the laser 30 and the pulse processing unit 21 processes the pulse signals from the photo detectors to extract reflected intensity and distance to objects 16 within the field of vision of the detector, including output power to the laser 30. The signal processing is typical for new radar and laser-radar systems and is illustrated schematically in FIG. 6.

A pulse and function generator 55 receives synchronization pulses (master trig, MT) from the signal and controller processor 27 when the sweeping unit 10 has reached an angle position within the regular sweep pattern, and generates a starting signal to the laser 30 which causes the latter to emit a laser pulse.

The current pulse(s) from the photo detector(s) 38 is amplified in current/voltage amplifiers 56 and move on to TVG amplifiers 57 (time-varied-gain), where the amplification increases with time to compensate for weakening caused by spherical diffusion and optical attenuation in the stratum of air between the sweeping unit 10 and reflecting objects 16. The time function for the amplification is selected from the operator panel 11 and is generated in the pulse and function generator 55 by means of clock pulses from a digitalization unit 58. A final set of time functions which are representative to different sight conditions (clear, hazy, rain, fog) is implemented in the pulse and function generator 55.

The received pulses from the TVG amplifiers 57 proceed further on to an analogous digitalization unit 58 which also receives the signal from the reference detector 34. Then, the digitalized signals are sent via cable to a signal processor 25 in the controller unit 11. The digitalization unit 58 preferably comprises fast A/D converters, data buffers and clock and transfers the digitalized signals to the signal processor 25 where distance and peak value for the return signals are calculated.

Furthermore processing of distance, peak and angle information (elevation and azimuth) are performed by the image and control processor 27. Both the signal and image processors are based upon a conventional modular DSP architecture where the particular processes are distribute on several digital signal processors (DSP), controlled by a PC processor (control processor).

Figure 7:
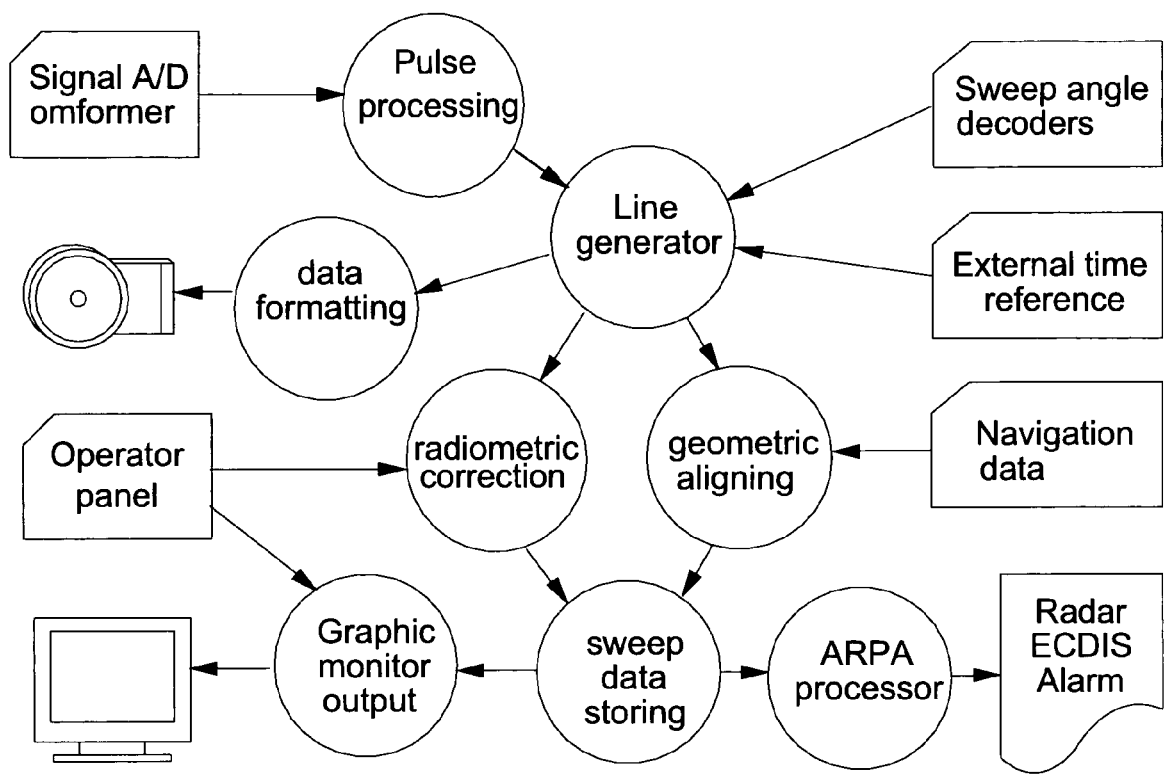
FIG. 7 shows schematically an overview of partial processes of the system.

FIG. 7 shows schematically an overview of the individual sub processes. The time course for the received signal between each laser pulse emitted is analyzed with regard to instances of return pulses which exceed a threshold given by the signal to noise relationship and a given probability of false detection. The first pulse is always the outgoing laser pulse, and the point of maximum which represents the peak effect of the laser pulse from the reference detector 34 is registered together with an accurate point in time for the emission. The remaining pulses either represent backscattered light from the stratum of air (rain, snow etc.), reflection from objects 16 or false noise pulses. In order to distinguish the object pulses from backscattered pulses, the detector 34 is based upon the simple hypothesis that the laser pulse is stopped by solid objects 16 with an extension larger than the laser spot, so that the last detected pulse with high probability represents reflection from the object 16. After the outgoing laser pulse has been detected, the search process is therefore started in the end of the time series and back in time. The last pulse is registered in the same way as the laser pulse, with a peak value and an accurate interpolated value for the detection point in time. Then the peak value is normalized with regard to the peak effect of the laser to correlate variations in sent effect, and the distance to the object is calculated by subtracting the point in time of emitted pulse and by multiplying with half of the speed of light (because of two-way transmission).

The registered intensity (peak) and distance values are sent to the line generator where all values for a vertical sweep line are accumulated. Then, every point is marked with the vertical sweep angle from the sweep angle decoder and every line is marked with the horizontal sweep angle including a time mark from an external time reference. The intensity values are correlated further with regard to deviation from the selected TVG function (radiometric correlation) so that the intensity values represent reflectivity of the objects 16 and not differences in illumination.

By means of navigation data (position, course, speed, rolling, stamping and throw) we can transform the data points from relative distance, azimuth and vertical angle to geographical coordinates; latitude, longitude and elevation above sea level. This is performed in the process called "geometrical creation" (FIG. 7). If the laser beam and the field of view have not been formerly stabilized as described above, we can use navigation data to correlate for rolling and stamping movements including course deviations (gearing) prior to presentation on the graphical monitor.

The correlated line data are collected in a sweep data storage which represents a complete sweep image. The sweep data storage is updated line by line if new lines are being generated. The graphical presentation processor picks data from the sweep data storage and generates sweep images both in central projection like a camera and in vertical projection (PPI) as for radar.

The ARPA module analyzes the sweep storage for detection of objects 16 within the sweep sector. Detected objects 16 are collected in an object database and classified as stationary or movable based upon correlation from sweep to sweep. A closest distance (CPA) and time to closest distance (TCPA) is calculated for all objects 16 as for conventional ARPA radar. Should the CPA reside within a defined safety zone for the vessel, an ARPA message in accordance with NMEA/IEC standard[4] is sent to other navigation monitors (ECDIS, Radar), and to the vessel alarm system.

Modifications

The described marine laser radar system can be implemented in numerous alternative ways by alternative selections of components. It is already mentioned that the line sweeper 45, 46 (FIG. 4) can be implemented with numerous optical components 43, 44 (FIG. 4), all having the characteristic of being able to deflect a laser beam at a fixed angle in relation to the incoming beam, such as Risley prisms, optical transmission grids and holographic elements (HOE). Among theses, optical transmission grids ("Volume Bragg Grating, VBG") and HOE's, point themselves out as suitable components in the rotating construction described here. The possibility of using an array of detectors 38 (FIG. 4) has also been mentioned, to be able to increase the sweeping speed compared to the use of single detectors. At the high sweeping speeds which the described utilization here involves, the line sweeper constitutes a critical element. Traditionally, the line sweepers are implemented by means of vibrating single mirrors or rotating multi facet mirrors. With synchronous sweeping of laser beam and larger receiver apertures by means of mirrors, which is required in depicting sweep systems, these systems often attain large dimensions (multi facet mirrors) and are power demanding (vibrating mirrors), wherein vibrating mirrors also can generate large vibrations in the optical-mechanical construction.

If large dimensions on the sweep unit can be tolerated, it is possible to implement the present sweep arrangement by means of a rotating multi facet mirror sweeper. In that case, this will replace the line sweeper 45, 46 (FIG. 4).

For the azimuth sweeper (sweep mechanism 20), as an alternative to the internal rotation of the azimuth sweeper, the whole sweeping unit can be rotated by means of an external motor. In this case the cylindrical window 23 (FIG. 4) could be replaced by a smaller level window which covers the field of view of the detection system.

As an alternative to the illustrated beam geometry (FIG. 4) where the laser beam is isolated from the receiver optics, the laser beam can be folded into the field of view of the receiver before the line sweeper by means of mirrors or prisms. This can reduce the dimensions of the deflection elements 43, 44, but will also reduce the reception area.

References

1. [1]NEK EN 60825-1[1] IEC 60825-1, Ed 1.2, 2001-08; Safety of laser products—Part 1: Equipment classification, requirements and user's guide.
2. [1] Performance Standards for Night Vision Equipment for High-Speed Craft (HSC), MSC 72/Add.1/Annex 12, Res. MSC.94(72) (adopted on 22 May 2000)
3. [1]ISO 16273:2003(E); Ships and marine technology—Night vision equipment for high-speed craft Operational and performance requirements, methods of testing and required test results
4. [1] NMEA 0183 v3.01, NMEA 2000

The invention claimed is:

1. A system for detection and imaging of objects (16) in the course of speed boats and other marine vessels and for warning about objects that may constitute a risk to the navigational safety, said vessels preferably exhibiting a navigation and communication system (28), said system comprising a scanning unit (10) for laser illumination of objects (16) within the field of view of the system, including a control unit (11) and an operator panel (12), characterized in that the scanning unit (10) includes:
   a light source (30), preferably an eye-safe IR laser provided to emit a laser beam (33) within the field of view of the system,
   an optics/sensor- and pulse processing unit (21) including optical detectors (34, 38) for monitoring the output power of the laser beam (33) and generation of trigger pulses for measurement of distances to objects (16), for reception/detection of radiant energy reflected from objects (16), including measurement of distance to the reflecting object(s) (16) based on the time delay between emitted and reflected light, including energy and peak power of the pulses, a first (19) and second (20) scanning mechanism, said scanning unit (10) being arranged to generate a regular pattern of laser spots on a water surface, where partly overlapping laser spots (17) are generated along radial scan lines (18) from the vessel by means of the first scanning mechanism (19) and by rotating the scan lines about a vertical axis by means of the second scanning mechanism (20) so that the entire or parts of the water surface around the vessel is covered with overlapping laser spots.

2. System in accordance with claim 1, characterized in that the scanning unit (10) is arranged to stabilize the scan area both in the horizontal and vertical plane from roll and pitch movements of the vessel as well as short term deviations from the steered course.

3. System in accordance with claim 1, characterized in that the first scanning mechanism (19) comprises two counter-rotating beam deflection elements (43, 44), such as Risley prisms, optical transmission gratings, diffractive optical elements or similar, each said beam deviation elements (43, 44) being mounted in an electrical motor (45, 46), said beam deflection elements (43, 44) preferably rotating at the same but opposite speed, to scan the laser beam (33) and the receiver field of view along a vertical scan line (18).

4. System in accordance with claim 1, characterized in that the second scanning mechanism (20) comprises a rotating mirror (47), preferably arranged at approximately 45 degrees to the rotation axis of the second scanning mechanism (20), which second scanning mechanism (20) in combination with the first scanning mechanism (19) is arranged to move the vertical scan line (18) horizontally in a regular pattern, such that the selected scan area is covered by partly overlapping laser beams.

5. System in accordance with claim 3, characterized in that the first scanning mechanism (19) in combination with the second scanning mechanism (20) scan the laser beam (33) and the field of view along straight radial lines; said lines being displaced in regular angular steps in horizontal direction synchronously with the first scanning mechanism (19).

6. System in accordance with claim 3, characterized in that the scan lines (18) which are generated in the first scanning mechanism (19) can be rotated a given angle about the rotational axis of the motors (45, 46) by adjusting the phase of the motor (46) for the second beam deflection element (44) in relation to the phase of the motor (45) of the first beam deflection element (43).

7. System in accordance with claim 3 characterized in that the scan lines (18) from the first scanning mechanism (19) are rotated synchronously with the rotation of the second scanning mechanism (20), so that the lines remain fixed in relation to the plane of incidence of the mirror (47), normal to the mirror surface.

8. System in accordance with claim 2, characterized in that roll, pitch and yaw angles are measured and transformed into a set of correction angles for the system.

9. System in accordance with claim 3, characterized in that the first scanning mechanism (19) corrects for deviation from verticality by adjusting the phase of the motor (46) for the beam deflection element (44) relative to the phase of the motor of the deflection element (43) such that the linescan angle is rotated an angle relative to the normal plane of the mirror in the second scanning mechanism (20) corresponding to the calculated correction angle, and/or that the second scanning mechanism (20) corrects for deviation in azimuth by rotating the mirror (47) an angle corresponding to the calculated correction angle, and/or that the second scanning mechanism (20) also corrects deviation in elevation by rotating (tilting) the mirror (47) about an axis normal to the rotational axis of the second scanning mechanism, an angle corresponding to the calculated correction angle.

10. System in accordance with claim 1, characterized in that the control unit (11) includes a scan motor controller (24) arranged to control speed and phase of the motors (45, 46) and emission of laser pulses, so that the laser spots obtain a fixed mutual distance both horizontally and vertically within the scan area.

11. System in accordance with claim 1, characterized in that the system is arranged to receive data from the navigation and communication system (28) of a vessel for measurement of steered course, speed and attitude (roll, pitch, yaw) and the video display system of a vessel for presentation of information.

12. System in accordance with claim 1, characterized in that the control unit (11) includes an image and control processor (27) provided with means and/or software to generate a monitor image on the operator panel (12), where the intensity of the returned signals and 3D position are shown both in a central projection as for a camera and in a vertical projection as for a radar.

13. System in accordance with claim 1, characterized in that the image and control processor (27) is provided with means and/or software to analyze the returned signals for detection of other vessels or objects (16) within the field of view of the system, generate standardized graphical symbols on the monitors and send standardized messages, such as NMEA/IEC, to other navigation systems, such as ECDIS or Radar, about calculated position, CPA, TCPA as well as course and speed for detected objects (16).

14. System in accordance with claim 1, characterized in that the image and control processor (27) is provided with means and/or software to send a standardized alarm message to the vessel's alarm system if CPA to the objects (16) are within a defined safety zone of the vessel.

* * * * *